US012142771B2

(12) United States Patent
Harutyunyan

(10) Patent No.: US 12,142,771 B2
(45) Date of Patent: Nov. 12, 2024

(54) FLEXIBLE BATTERY AS AN INTEGRATION PLATFORM FOR WEARABLE SENSORS AND PROCESSING/TRANSMITTING DEVICES

(71) Applicant: HONDA MOTOR CO., LTD., Tokyo (JP)

(72) Inventor: Avetik R. Harutyunyan, Santa Clara, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/560,747

(22) Filed: Sep. 4, 2019

(65) Prior Publication Data

US 2020/0243807 A1     Jul. 30, 2020

Related U.S. Application Data

(60) Provisional application No. 62/798,938, filed on Jan. 30, 2019.

(51) Int. Cl.
*H01M 50/105*     (2021.01)
*H01M 50/136*     (2021.01)

(52) U.S. Cl.
CPC ....... *H01M 50/105* (2021.01); *H01M 50/136* (2021.01)

(58) Field of Classification Search
CPC .. H01M 50/10; H01M 50/105; H01M 50/256; H01M 50/136; H01M 2/027; H01M 2/0275; H01M 10/46; H01M 10/465; H01M 10/0436; H01M 10/425; A61B 5/6801; A61B 5/0002; A61B 2560/0214
See application file for complete search history.

(56) References Cited

U.S. PATENT DOCUMENTS

| | | |
|---|---|---|
| 3,513,034 A | 5/1970 | Fischbach et al. |
| 3,772,084 A | 11/1973 | Scholle |
| 4,119,771 A | 10/1978 | Saridakis |
| 5,985,175 A | 11/1999 | Fan et al. |
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |

(Continued)

FOREIGN PATENT DOCUMENTS

| | | |
|---|---|---|
| CN | 1922347 A | 2/2007 |
| CN | 1972739 A | 5/2007 |

(Continued)

OTHER PUBLICATIONS

International Search Report and Written Opinion, issued by International Searching Authority in related International Application No. PCT/US2020/020993, mailed on Jul. 2, 2020.

(Continued)

*Primary Examiner* — Matthew T Martin
*Assistant Examiner* — Grace Ann Kenlaw
(74) *Attorney, Agent, or Firm* — ArentFox Schiff LLP; Mark Duell

(57) ABSTRACT

The present disclosure relates to devices integrated with flexible batteries wherein the flexible batteries can be wearable and can provide an integration platform for various electronic devices.

16 Claims, 6 Drawing Sheets

(56) References Cited

U.S. PATENT DOCUMENTS

| | | |
|---|---|---|
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,658,651 B2 | 5/2020 | Pierce et al. |
| 10,957,939 B2 | 3/2021 | Zhi et al. |
| 2001/0033962 A1* | 10/2001 | Suzuki ............... H01M 50/119 29/623.2 |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1* | 7/2005 | Reiter .................. G16H 20/30 600/508 |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0228289 A1 | 10/2006 | Harutyunyan et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2009/0317710 A1 | 12/2009 | Douglas et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0178543 A1 | 7/2010 | Gruner et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0096465 A1 | 4/2011 | Zhou et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0174519 A1 | 7/2011 | Shah et al. |
| 2011/0177393 A1 | 7/2011 | Park et al. |
| 2011/0281156 A1 | 11/2011 | Boren et al. |
| 2011/0311874 A1 | 12/2011 | Zhou et al. |
| 2012/0034516 A1 | 2/2012 | Koo et al. |
| 2012/0105370 A1 | 5/2012 | Moore |
| 2012/0107683 A1 | 5/2012 | Kim et al. |
| 2012/0121986 A1 | 5/2012 | Balu et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hocke et al. |
| 2012/0156034 A1 | 6/2012 | Sabannavar et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0295161 A1 | 11/2012 | Wang et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1* | 7/2013 | Lashmore ............... H01B 1/04 29/623.2 |
| 2013/0224561 A1 | 8/2013 | Hiralal et al. |
| 2013/0256011 A1 | 10/2013 | Chang et al. |
| 2013/0323583 A1 | 12/2013 | Phares |
| 2014/0005960 A1 | 1/2014 | Anderson et al. |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0093769 A1 | 4/2014 | Busnaina et al. |
| 2014/0141248 A1 | 5/2014 | Noyes |
| 2014/0170490 A1 | 6/2014 | Izuhara et al. |
| 2014/0178543 A1 | 6/2014 | Russell et al. |
| 2014/0255782 A1 | 9/2014 | Jabbour et al. |
| 2014/0287304 A1* | 9/2014 | Netz .................... H01M 4/13 156/60 |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |

(56) References Cited

U.S. PATENT DOCUMENTS

| | | | |
|---|---|---|---|
| 2015/0340741 A1 | 11/2015 | Kim et al. | |
| 2015/0349325 A1 | 12/2015 | Chen et al. | |
| 2015/0364750 A1 | 12/2015 | Maheshwari et al. | |
| 2015/0372344 A1 | 12/2015 | Iwasaki et al. | |
| 2015/0380738 A1* | 12/2015 | Zhou | H01M 4/625 429/223 |
| 2016/0009557 A1 | 1/2016 | Harutyunyan et al. | |
| 2016/0013457 A1 | 1/2016 | Suh et al. | |
| 2016/0013458 A1 | 1/2016 | Suh et al. | |
| 2016/0020437 A1 | 1/2016 | Sohn et al. | |
| 2016/0023905 A1 | 1/2016 | Wei | |
| 2016/0036059 A1 | 2/2016 | Tokune et al. | |
| 2016/0040780 A1 | 2/2016 | Donahue | |
| 2016/0049569 A1 | 2/2016 | Negrin | |
| 2016/0079629 A1 | 3/2016 | Abe et al. | |
| 2016/0082404 A1 | 3/2016 | Pigos | |
| 2016/0094079 A1* | 3/2016 | Hiroki | H02J 50/12 320/101 |
| 2016/0126554 A1 | 5/2016 | Beneventi et al. | |
| 2016/0149193 A1 | 5/2016 | Seong | |
| 2016/0149253 A1 | 5/2016 | Yi et al. | |
| 2016/0166837 A1 | 6/2016 | Strommer et al. | |
| 2016/0329533 A1 | 11/2016 | Tajima | |
| 2016/0365544 A1 | 12/2016 | Lee et al. | |
| 2016/0372717 A1 | 12/2016 | Noda | |
| 2017/0005504 A1 | 1/2017 | Rho et al. | |
| 2017/0018799 A1 | 1/2017 | Jeong | |
| 2017/0033326 A1 | 2/2017 | Goto et al. | |
| 2017/0040582 A1 | 2/2017 | Kim | |
| 2017/0155098 A1 | 6/2017 | Park et al. | |
| 2017/0155099 A1 | 6/2017 | Song et al. | |
| 2017/0214052 A1 | 7/2017 | Xu | |
| 2017/0263972 A1 | 9/2017 | Rho et al. | |
| 2017/0288255 A1 | 10/2017 | Kim et al. | |
| 2017/0338439 A1 | 11/2017 | Yokoyama | |
| 2017/0338449 A1* | 11/2017 | Rho | H01M 50/414 |
| 2017/0338489 A1 | 11/2017 | Miwa et al. | |
| 2018/0026236 A1 | 1/2018 | Lee et al. | |
| 2018/0062417 A1 | 3/2018 | Choi et al. | |
| 2018/0115026 A1 | 4/2018 | Mairs | |
| 2018/0240609 A1 | 8/2018 | Park et al. | |
| 2018/0241081 A1 | 8/2018 | Deng et al. | |
| 2018/0261818 A1* | 9/2018 | Roumi | G01R 31/3828 |
| 2018/0309117 A1 | 10/2018 | Zhu et al. | |
| 2019/0027638 A1 | 1/2019 | Masuda et al. | |
| 2019/0033602 A1 | 1/2019 | Lee et al. | |
| 2019/0036103 A1 | 1/2019 | Pierce et al. | |
| 2019/0088925 A1 | 3/2019 | Harutyunyan et al. | |
| 2019/0099129 A1 | 4/2019 | Kopelman et al. | |
| 2019/0115633 A1 | 4/2019 | Akihisa | |
| 2019/0122464 A1 | 4/2019 | Delong et al. | |
| 2019/0140270 A1 | 5/2019 | Wang et al. | |
| 2019/0171315 A1 | 6/2019 | Park et al. | |
| 2019/0237748 A1 | 8/2019 | Shin et al. | |
| 2019/0393486 A1 | 12/2019 | He et al. | |
| 2020/0006772 A1 | 1/2020 | Yu et al. | |
| 2020/0264663 A1 | 8/2020 | Kumta et al. | |
| 2021/0399289 A1 | 12/2021 | Eshraghi et al. | |

FOREIGN PATENT DOCUMENTS

| | | |
|---|---|---|
| CN | 101627494 A | 1/2010 |
| CN | 101801394 A | 8/2010 |
| CN | 101809790 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 102856579 A | 1/2013 |
| CN | 102945947 A | 2/2013 |
| CN | 103187573 A | 7/2013 |
| CN | 103187574 A | 7/2013 |
| CN | 103187575 A | 7/2013 |
| CN | 103204492 A | 7/2013 |
| CN | 102674316 B | 5/2014 |
| CN | 104064725 A | 9/2014 |
| CN | 204072059 U | 1/2015 |
| CN | 104752651 A | 7/2015 |
| CN | 103219467 B | 11/2015 |
| CN | 103715394 B | 1/2016 |
| CN | 105513823 A | 4/2016 |
| CN | 105765764 A | 7/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 106602012 A | 4/2017 |
| CN | 104362326 B | 8/2017 |
| CN | 107004827 A | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 109326765 A | 2/2019 |
| CN | 109509866 A | 3/2019 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2009-091604 A | 4/2009 |
| JP | 2010-277925 A | 12/2010 |
| JP | 2012-512956 A | 6/2012 |
| JP | 2015105208 A | 6/2015 |
| JP | 2015-521347 A | 7/2015 |
| JP | 2015138777 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-2009-0125681 A | 12/2009 |
| KR | 10-2010-0120298 A | 11/2010 |
| KR | 10-1548465 B1 | 8/2015 |
| KR | 10-2016-0047643 A | 5/2016 |
| KR | 10-1632109 B1 | 6/2016 |
| KR | 20160114389 A * | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| TW | 201140915 A | 11/2011 |
| WO | WO 2005/052053 A1 | 6/2005 |
| WO | WO 2005/096089 A1 | 10/2005 |
| WO | WO 2012/156297 A2 | 11/2012 |
| WO | WO 2013/052704 A1 | 4/2013 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WO 2016/178210 A1 | 11/2016 |
| WO | WO 2017/052248 A1 | 3/2017 |

(56) References Cited

FOREIGN PATENT DOCUMENTS

| | | |
|---|---|---|
| WO | WO 2017/083566 A1 | 5/2017 |
| WO | WO 2017/120391 A1 | 7/2017 |
| WO | WO 2017/131451 A1 | 8/2017 |
| WO | WO 2017/199884 A1 | 11/2017 |
| WO | 2018110776 A1 | 6/2018 |
| WO | WO 2018/110933 A1 | 6/2018 |
| WO | WO 2018/194414 A1 | 10/2018 |
| WO | WO 2018/194415 A1 | 10/2018 |
| WO | WO 2019/027147 A1 | 2/2019 |

OTHER PUBLICATIONS

Communication dated Dec. 22, 2020, from the Japanese Patent Office in related application No. 2020-002026.
David Schiller, "Development of a Stretchable Battery Pack for Wearable Applications", submitted by David Schiller, BSc., Johannes Kepler University Linz, Nov. 2019, 28 Pages Total, https://epub.jku.at/obvulihs/content/titleinfo/4605900/full.pdf.
International Search Report and Written Opinion, issued by International Searching Authority in related International Application No. PCT/US2020/043017, mailed on Dec. 14, 2020.
Kun Kelvin Fu et al., "Flexible Batteries: From Mechanics to Devices", 2016 American Chemical Society, ACS Publications, ACS Energy Letters 1, pp. 1065-1079, (2016).
Sau Yen Chew et al., "Flexible free-standing carbon nanotube films for model lithium-ion batteries", Carbon 47, pp. 2976-2983, (2009).
Sheng Xu et al., "Stretchable batteries with self-similar serpentine interconnects and integrated wireless recharging systems" Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
Zhigian Wang et al., "Fabrication of High-Performance Flexible Alkaline Batteries by Implementing Multiwalled Carbon Nanotubes and Copolymer Separator" Advanced Materials 26, pp. 970-976, (2014).
Zhigiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Communication dated Jan. 6, 2021, from the Japanese Patent Office in related application No. 2020-002545.
International Search Report and Written Opinion, issued by International Searching Authority in corresponding International Application No. PCT/US2020/039821, mailed on Sep. 30, 2020.
Communication dated Aug. 26, 2019, from the European Patent Office in related European Application No. 18186402.6.
Communication dated Feb. 4, 2020, from the European Patent Office in counterpart European Application No. 18 173 644.8.
Communication issued by International Searching Authority in related International Application No. PCT/US19/49923, mailed on Nov. 13, 2019 (PCT/ISA/206).
Office Action issued by the European Patent Office in related European Patent Application No. 18184002.6, dated May 13, 2020.
Wikipedia., Zinc-carbon battery., https://en.wikipedia.org/wiki/Zinc-carbon_battery, Retrieved from "https://en.wikipedia.org/w/index.php?title=Zinc-carbon_battery&oldid=880297331", (2019), (5 Pages Total).
Grillo-Werke AG, Battery Powder, https://grillo.de/?page_id=60&lang=en, 3 Pages Total, (2019).
International Search Report and Written Opinion, issued by International Searching Authority in corresponding International Application No. PCT/US19/49923, mailed on Jan. 23, 2020.
Communication issued by the International Searching Authority in corresponding International Application No. PCT/US19/49923, mailed on Nov. 13, 2019 (PCT/ISA/206).

A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A.J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in counterpart European Application No. 18194454.7.
Danafar, F. et. al., "Fluidized bed catalytic chemical vapor deposition synthesis of carbon nanotubes—A review," The Chemical Engineering Journal, vol. 155, pp. 37-48, 2009.
Dunens, O., et. al., "Synthesis of Multiwalled Carbon Nanotubes on Fly Ash Derived Catalysts," Environ. Sci. Technol., vol. 43, pp. 7889-7894, 2009.
Extended European Search Report issued in corresponding European Application No. 18184002.6 dated Nov. 30, 2018.
Extended European Search Report issued in corresponding European Patent Application No. 18194469.5 dated Dec. 4, 2018.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
Jenax Inc., Flexible Lithium Polymer Battery J . FLEX, Copyright 2014, (6 Pages Total).
Joo-Seong Kim et al., Supporting Information, A Half Millimeter Thick Coplanar Flexible Battery with Wireless Recharging Capability, Nano Letters 2015 15 (4), 9 Pages Total, (2015).
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sebastian Anthony., LG produces the first flexible cable-type lithium-ion battery, ExtremeTech, Aug. 30, 2012, (9 Pages Total).
The Extended European Search Report issued in corresponding European Patent Application No. 18186402.6 dated Oct. 11, 2018.
The Swatch Group Ltd., A revolutionary battery by Belenos: The Watchmaker Swatch Group Has Signed An Agreement With The Chinese Geely Group For Use Of Its Innovative New Battery., as

(56) References Cited

OTHER PUBLICATIONS accessed on May 29, 2019, (3 Pages Total), https://www.swatchgroup.com/en/swatch-group/innovation-powerhouse/industry-40/revolutionary-battery-belenos.
Vishwam Sankaran., Samsung is reportedly developing a curved battery for its foldable phone, Jul. 4, 2018, (4 Pages Total).
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Zhao, M.Q. et al., "Towards high purity graphene/single-walled carbon nanotube hybrids with improved electrochemical capacitive performance," Carbon, vol. 54, pp. 403-411, 2013.
Communication dated Aug. 26, 2019, from the European Patent Office in counterpart European Application No. 18186402.6.
Extended European Search Report issued in corresponding European Patent Application No. 18173644.8 dated Oct. 12, 2018.
Extended Search Report of related EP Application No. 18 19 4454 dated Jul. 23, 2019.
O.M. Marago, et al, "Optical trapping of carbon nanotubes", Physica E, 40 (2008), pp. 2347-2351.
Notice of Reasons for Rejection dated Aug. 17, 2021, from the Japanese Patent Office in related application No. 2020-002545.
Notification of the First Office Action dated Jul. 16, 2021, from the State Intellectual Property Office of People's Republic of China in related Application No. 201710151455.7.
Aminy E. Ostfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Jul. 27, 2021, issued by the Korean Intellectual Property Office in related Korean Application No. 10-2020-0005929.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
Fenghua Su et al., "High-Performance Two-Ply Yarn Supercapacitors Based on Carbon Nanotube Yarns Dotted with CO3O4 and NiO Nanoparticles", Small 2015, 11, No. 7, pp. 854-861 with Supporting Information(12 Pages Total), www.small-journal.com, (Year: 2015).
Communication dated Nov. 9, 2021, from the Japanese Patent Office in related application No. 2018-172178.
Communication dated May 6, 2022, from the State Intellectual Property Office of People's Republic of China in Chinese Application No. 201710150360.3.
Shan Jiang et al., "Series in Science Communication by Chinese Academy of Sciences: Nanometer", Popular Science Press, pp. 155-157, Sep. 2013.(Cited in CN Application No. 201710150360.3, dated May 6, 2022).
Yurong Liu, "Applications of Carbon Materials in Supercapacitor", National Defense Industry Press, (p. 142, 2 pages total), Jan. 2013.(Cited in CN Application No. 201710150360.3, dated May 6, 2022).
Communication dated Sep. 26, 2021, issued by the Korean Intellectual Property Office in related Korean Application No. 10-2018-0058433.
Communication dated Jan. 27, 2022, from the State Intellectual Property Office of People's Republic of China in related Application No. 201710150360.3.
Communication dated Mar. 22, 2022, from the State Intellectual Property Office of People's Republic of China in Application No. 201811076414.7.
Ying Shi et al., "Graphene-based integrated electrodes for flexible lithium ion batteries", 2D Materials 2 (2015): 024004. (Year: 2015), (9 Pages Total).
Communication dated Mar. 22, 2022, from the Japanese Patent Office in application No. 2018-142355.
Communication dated Feb. 23, 2022, from the State Intellectual Property Office of People's Republic of China in Application No. 202010079226.0.
Office Action dated Jun. 28, 2022, issued by the Korean Patent Office in Korean Application No. 10-2022-0057879.
First Office Action dated Aug. 25, 2022, from the State Intellectual Property Office of People's Republic of China in Application No. 201810503719.5.
Ling-ling Gu et al., "Preparation and Applications of Carbon Nanotube/ Polymer Composites", Polymer Materials Science and Engineering, vol. 25 , No. 11, (Nov. 2009), (5 Pages Total, abstract on p. 5).
Communication dated Feb. 28, 2023 from the Japanese Patent Office in application No. 2021-509213.
Communication dated Nov. 11, 2022, from the Chinese Patent Office in Chinese Application No. 202010079226.0.
Cha, Seung I., et al., "Mechanical and electrical properties of cross-linked carbon nanotubes." Carbon 46.3 (2008): pp. 482-488 (Year: 2008).
Communication dated Oct. 19, 2022, from the State Intellectual Property Office of People's Republic of China in Application No. 201811076414.7.
Communication dated Oct. 9, 2022, from the Chinese Patent Office in Chinese Application No. 202010002766.9.
Ye, Huating, et al., "A true cable assembly with a carbon nanotube sheath and nickel wire core: a fully flexible electrode integrating energy storage and electrical conduction", Journal of Materials Chemistry A 2018; 6: pp. 1109-1118, The Royal Society of Chemistry, (2018).
Mallakpour et al., "Carbon nanotube-metal oxide nanocomposites: Fabrication, properties and applications," Chemical Engineering Journal, Oct. 2016, vol. 302, pp. 344-367.
Shah et al., "A layered Carbon Nanotube Architecture for High Power Lithium Ion Batteries," Journal of the Electrochemical Society, May 2014, vol. 161, No. 6, pp. A989-A995.
Office Action in CN202010002766.9, mailed Jun. 1, 2023, 19 pages.
Office Action in KR20180088457, mailed Jan. 15, 2024, (16 pages Total).
Office Action in CN201980058530.2, mailed Dec. 28, 2023, 23 pages.
Office Action in CN202080051895.5, mailed Dec. 27, 2023, 24 pages.

* cited by examiner

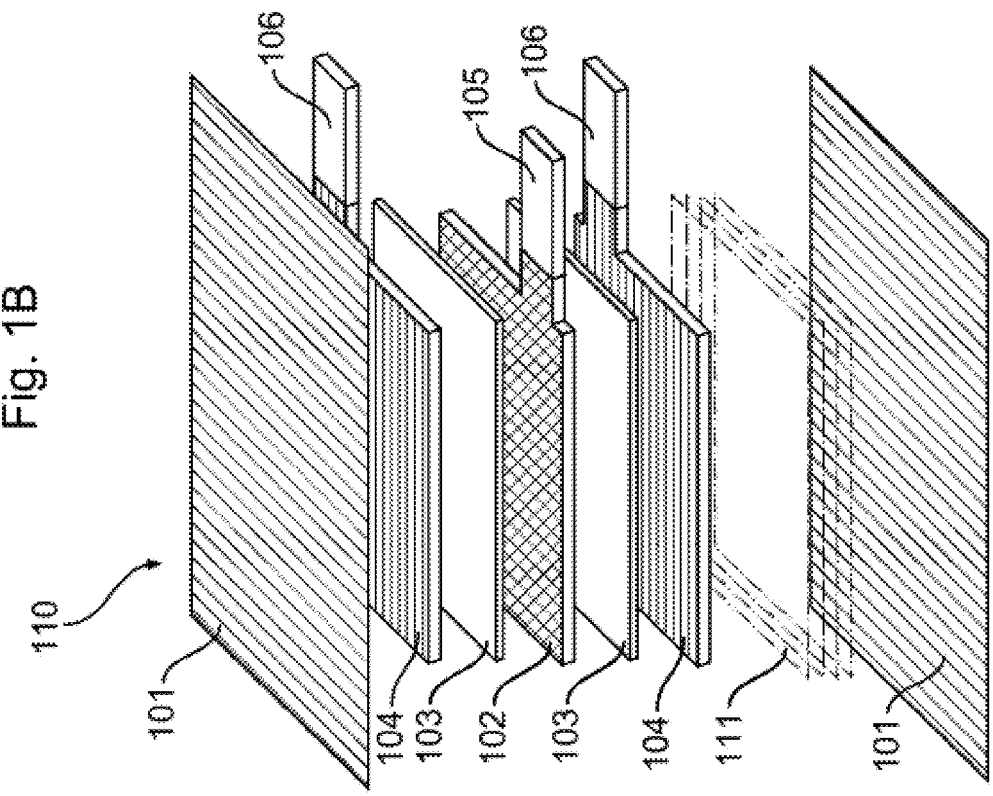
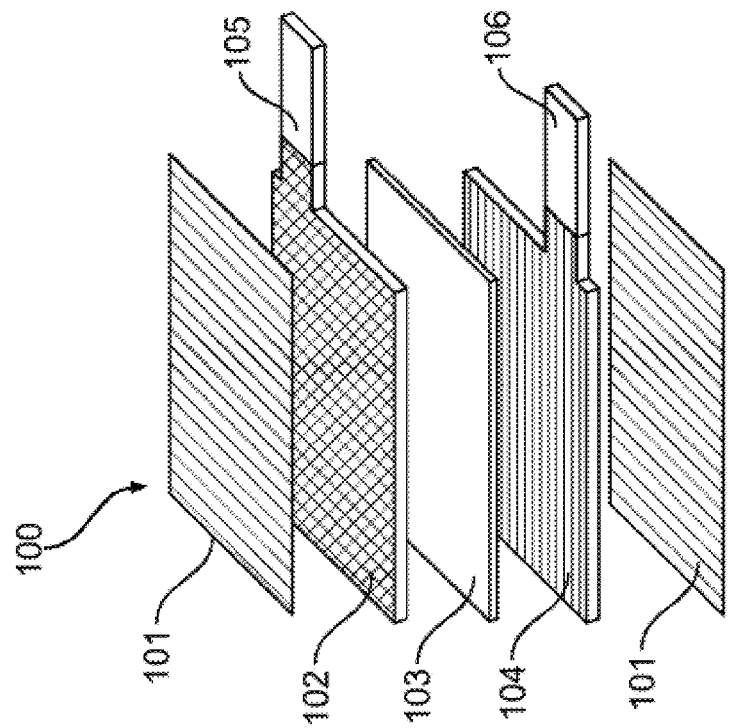

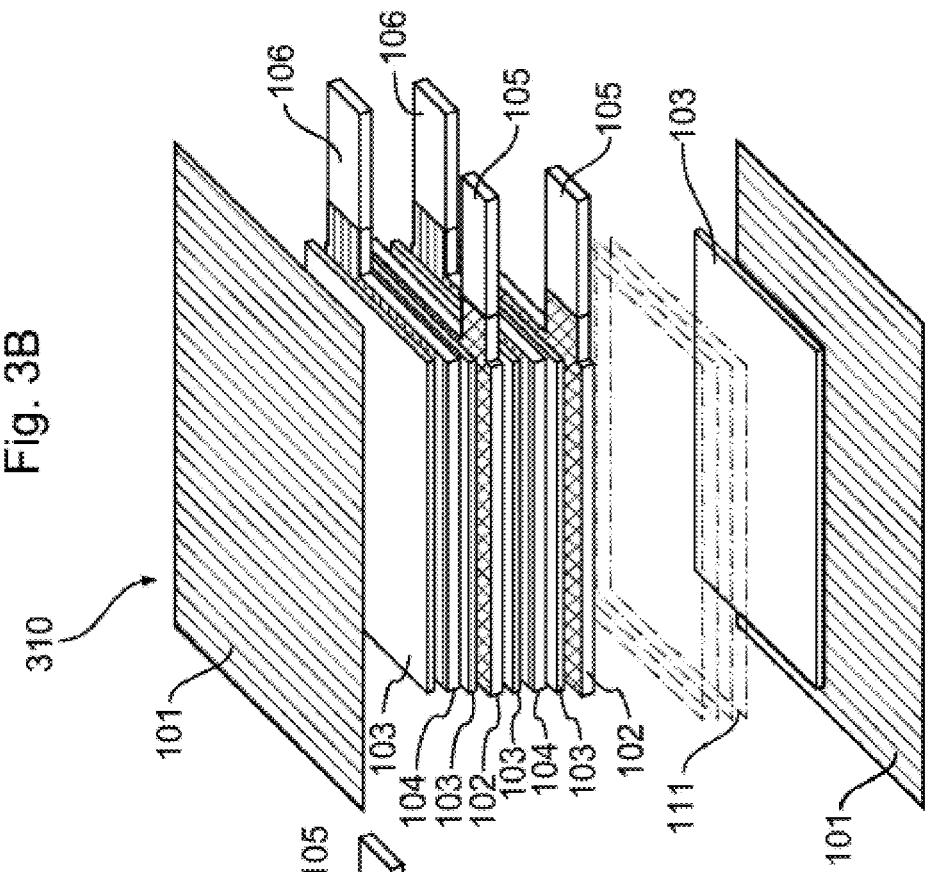
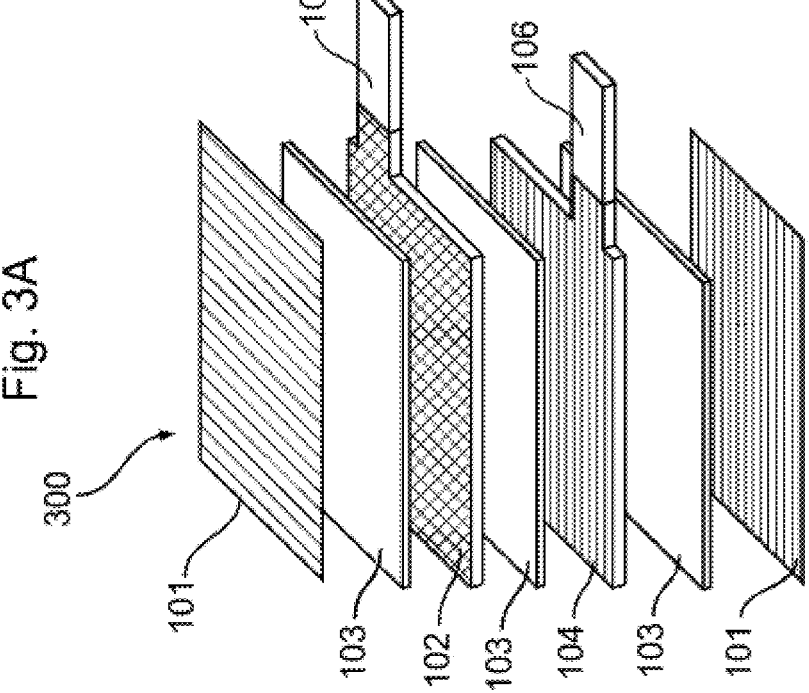

FLEXIBLE BATTERY AS AN INTEGRATION PLATFORM FOR WEARABLE SENSORS AND PROCESSING/TRANSMITTING DEVICES

CROSS-REFERENCE TO RELATED APPLICATIONS

This application claims priority to U.S. Provisional Application No. 62/798,938 filed Jan. 30, 2019, entitled "Flexible Battery as an Integration Platform for wearable Sensors and Processing/Transmitting Devices", which is hereby incorporated by reference herein in its entirety.

BACKGROUND

With recent intense developments of wearable devices, healthcare, cosmetics, wearable medical sensors and drug delivery devices, portable electronics, smart packaging, and RFID, among other applications, the development of thin, flexible batteries with high energy density is becoming an essential challenge for providing proper power to the respective devices.

Depending on the device, these batteries should provide the potential not only proper for current electronics (V-range), but also possess energy from µWh up to kWh to cover a broad range of applications. However, these new applications, apart from electrical parameters, also require the batteries to be flexible, thin, stretchable, rollable, bendable, and foldable, and to cover micro- and large areas. These features are hard to achieve in typical battery design, where electrodes are printed on current collectors, such as metal foils; and for batteries encapsulated into rigid enclosures, such as coin, cylindrical or prismatic cells.

Nanomaterials are known to be extremely sensitive to their surrounding environment and therefore there is a need to develop new sensing materials and devices for a wide range of areas including environmental pollution, space exploration, homeland security, biology and medicine. Among applications of wearable sensors or devices, the real time monitoring of human physiological state is of central importance. For this aim it is necessary to combine the technical requirements of wearable devices with their mechanical properties such as they should be also comfortable, flexible, light, miniature, washable and so on. Hence, there is a need for new design and materials for batteries powering and providing mechanical support for this fast emerging field of wearable devices.

SUMMARY

The present disclosure relates to wearable devices integrated with flexible batteries. In some embodiments, the present disclosure is directed to a wearable device comprising: a flexible battery; and an electronic device attached to, printed on, and/or embedded in a packaging layer of the flexible battery and powered by the flexible battery. According to some aspects, the electronic device is selected from sensors, microprocessors, wireless communication/transmitting devices, circuit boards, electronics, and mixtures thereof.

In some aspects, the packaging layer of the flexible battery provides a supporting substrate for a wearable device or for sensors. In some embodiments, the sensors can be selected from a heart rate sensor, respiratory rate sensor, blood pressure sensor, blood oxygen sensor, body temperature sensor, muscle activity sensor, seizure event sensor, electroencephalography (EEG) sensor, epileptic crises sensor, electroencephalogram (ECG) sensor, electromyographic data (EMG) sensor, electrodermal activity (EDA) sensor, pollutant sensor, movement sensor, and mixtures thereof. In some embodiments, a transmitter can transmit a signal if one or more sensors registers a threshold value, for example, a low body temperature.

In some embodiments, the packaging layer is a pouch cell, and the pouch cell comprises: an anode including an anode composite material having anode active material particles in a three-dimensional cross-linked network of carbon nanotubes; a cathode including a cathode composite material having cathode active material particles in a three-dimensional cross-linked network of carbon nanotubes; and a flexible separator membrane between the anode and the cathode. In some aspects, the pouch cell comprises a polymer. In some aspects, the flexible battery is encapsulated within the pouch cell in a flat or folded configuration, for example, a flexible battery can be folded inside the packaging layer one or more times. According to some aspects, methods of making electronic devices with flexible batteries as an integration platform for electronic devices are disclosed herein.

BRIEF DESCRIPTION OF THE DRAWINGS

FIGS. 1A and 1B show schematic views of single-cell (FIG. 1A) and multi-cell (FIG. 1B) configurations of batteries according to some aspects of the present disclosure.

FIGS. 3A and 3B show schematic views of single-cell (FIG. 3A) and multi-cell (FIG. 3B) configurations of batteries according to other aspects of the present disclosure.

DETAILED DESCRIPTION

Figure 2A:
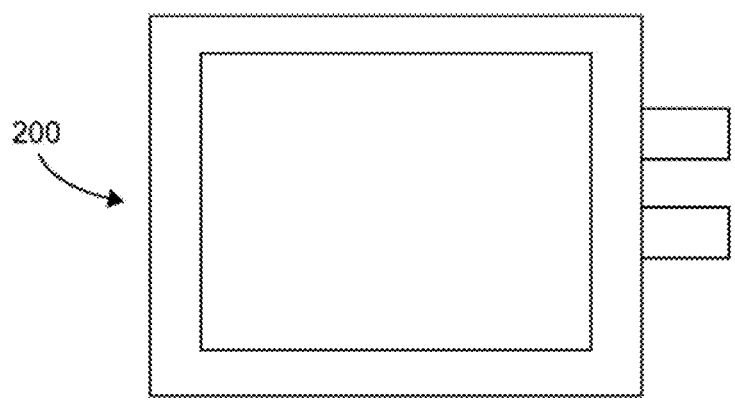
FIGS. 2A and 2B show a pouch battery according to some aspects of the present disclosure, with the pouch battery in both flat (FIG. 2A) and rolled (FIG. 2B) configurations, shown both schematically (FIGS. 2A and 2B).

The present disclosure is directed to a flexible battery that includes an anode including a composite material having anode active material (graphite, silicon, etc.) particles in a three-dimensional cross-linked network of carbon nanotubes; a cathode including a composite material having cathode active material particles in a three-dimensional cross-linked network of carbon nanotubes; and a separator positioned between the anode and the cathode. In some aspects, the battery is free of current collectors. In some aspects, the cathode, the anode, and the separator are packed in a pouch cell. This pouch cell enclosure is suitably flexible. In some aspects, the pouch cell may be a polymer pouch cell. In some aspects, the packaging material of flexible battery provides a substrate to attach, print, or embed the required devices. In some aspects, the flexible battery is configured for use in the form of wrist/ankle bands, straps, or patches. According to some aspects, the wearable device can be configured for attachment to limbs, torso, or head of an animal or a human. In some aspects, data collected by the sensors is processed by an onboard processor or is wired or wirelessly transmitted to a mobile device for processing and displaying. In some aspects, the mobile device is a smartphone.

In some embodiments, the one or more electronic devices is positioned inside of the flexible packing material, outside of the flexible packaging material, or embedded in the flexible packaging material.

The electrodes in the battery are not supported by current collector foils, such as aluminum for the cathode or copper for the anode, and may not contain binder, which can crumble or flake off. Instead, the electrodes are self-standing. Without wishing to be bound to any particular theory, the presence of carbon nanotube webs renders the electrodes self-standing and flexible; and the flexible electrodes give rise to a flexible battery. Batteries according to the present disclosure successfully operate under a broad range of bending, rolling, and folding (at angles greater than) 180° along various battery axes, in a rectangular pouch cell.

As used herein, an electrode that is "flexible" is able to be bent without cracking or breaking. As will be known to those of ordinary skill in the art, flexibility may depend on one or more chemical and/or material factors, including but not limited to composition and degree of compression.

In some variations, the present disclosure is directed to a wearable device comprising: a flexible packaging material; a flexible battery positioned in the flexible packaging material, the flexible battery comprising an electrode, the electrode comprising a composite material including an active material particles in a three-dimensional cross-linked network of carbon nanotubes; and one or more electronic devices powered by the flexible battery.

As used herein, the term "about" is defined to being close to as understood by one of ordinary skill in the art. In one non-limiting embodiment, the term "about" is defined to be within 10%, preferably within 5%, more preferably within 1%, and most preferably within 0.5%.

In addition, the thickness of the self-standing electrode may be modified by pressing, which may reduce the overall thickness by as much as 5 times, such as by about 4 times, by about 3 times, by about half, by about 1.5 times, by about 1.1 times, or any range in between. For example, a self-standing electrode with a thickness of 100 um may be pressed to a thickness of 50 um (i.e., reduced overall thickness by half), or a self-standing electrode with a thickness of 500 um may be pressed to a thickness of 100 um (i.e., reduced overall thickness by 5 times). In some aspects, pressing reduces overall thickness by half. In some aspects, pressing reduces overall thickness by about 1.1 to by about 5 times. In some aspects, pressing reduces overall thickness by about 1.5 times to by about 3 times. The optimal degree and/or limits of pressing for a given material can be determined by persons of ordinary skill in the art. Suitably, pressing does not substantially destroy active material particles/flakes, i.e., as a general guidance, not more than 25% of the particles or flakes are damaged. The exact percentage of the acceptable particle damage may vary for different active materials and for different formulations of the electrode composites, and need to be determined in each case by those of ordinary skill in the art. For batteries with liquid or gel electrolytes, suitably, enough voids remain in the material after pressing for efficient electrolyte access, i.e., at least 50% of the surface (preferably, 100% of the surface) of each particle or flake of the active material is wetted by the electrolyte. Additionally, the voids are suitably still interconnected after pressing, i.e., no trapped inaccessible voids.

As a general guideline, the density of the pressed material should suitably be below the bulk density of the active material powder (not the density of the active material, which is higher; e.g., for NMC (Lithium Nickel Manganese Cobalt Oxide, $LiNi_xMn_yCo_zO_2$) powder the bulk density is ca. 2.35 $g/cm^3$, while the density of NMC itself is >3.5 $g/cm^3$). Pressing electrode material to a density approaching or exceeding the bulk density of the active material powder, can lead to electrode material that may crack easily and no longer be flexible.

Pressing may improve flexibility, mechanical strength, and/or electrolyte accessibility in batteries according to aspects of the present disclosure. Pressing also modifies the density of the electrode. Suitable methods and apparatuses for pressing electrodes are known in the art are included but are not limited to those disclosed in U.S. patent application Ser. No. 15/665,171, entitled "Self-Standing Electrodes and Methods for Making Thereof," filed Jul. 31, 2017, which is hereby incorporated by reference herein in its entirety. According to aspects of the present disclosure, individual electrodes may be pressed, or entire assemblies of multiple electrodes separated by separators may be collectively pressed, with or without the pouch cell present. In some aspects, pressing reduces overall thickness about 1.1 to about 5 times. In some aspects, pressing reduces overall thickness about 1.5 times to about 3 times.

As is known to those of ordinary skill in the art, pressing or compression may improve electrical and/or mechanical contact between the battery tab and the composite, and it may also make the composite mechanically stronger. However, too much compression or pressing can hinder electrolyte access to the inner parts of the electrode, and complicate the movement of metal ions in and out of the electrode, thereby worsening battery dynamic characteristics. Too much compression may also lead to rigid and brittle electrodes, easily forming cracks and disintegrating; this can either reduce the battery capacity, or destroy it completely. Alternatively, too little compression may not provide enough contact leading to mechanically weak electrode material, insufficient electrical contacts within the material (and, thus, lower electrical conductivity of the material and inefficient current collection from the active material particles), and/or incomplete mechanical trapping of the active material particles within the nanotube network (they can be washed-out by the electrolyte). Insufficient pressing may also result in thicker electrodes, requiring more electrolyte to completely wet them, therefore reducing the energy storage density of the battery. In addition, excessive pressing may cause punctures in the separator membrane; which is not a desirable outcome. In addition, it may be desirable to regulate the distance between the rolls or rollers in a rolling press or calendaring machine, or between the plates of a platen press. It is within the knowledge of those of ordinary skill in the art to determine optimal pressing thickness based on the properties desired in the electrode. Suitable apparatuses for pressing electrodes and/or batteries of the present disclosure include, but are not limited to, roller mills and hydraulic presses.

As used herein, "electrode active material" refers to the material hosting metal (e.g. lithium) in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

According to some aspects, a method of making a wearable integration platform for an electronic device is disclosed herein, the method comprising: providing a flexible battery having a packaging layer; embedding in, printing on, and/or attaching one or more electronic devices to the packaging layer; and electrically connecting the one or more electronic devices to the flexible battery. In some embodiments, a method of making an electronic device is disclosed herein, comprising: assembling an electronic device by a method comprising printing in, embedding in, attaching to a flexible battery packaging, or combinations thereof; and providing power to the electronic device from a flexible battery comprising the flexible battery packaging, to form an electronic device.

Metals in lithium metal oxides according to the present disclosure may include but are not limited to one or more alkali metals, alkaline earth metals, transition metals, aluminum, or post-transition metals, and hydrates thereof. Non-limiting examples of lithium metal oxides include lithiated oxides of Ni, Mn, Co, Al, Mg, Ti, and any mixture thereof. In an illustrative example, the lithium metal oxide is lithium nickel manganese cobalt oxide ($LiNi_xMn_yCo_zO_2$, $x+y+z=1$), for example, $Li(Ni,Mn,Co)O_2$, Li—Ni—Mn—Co—O, ($LiNiMnCoO_2$). The lithium metal oxide powders can have a particle size defined within a range between about 1 nanometer and about 100 microns, or any integer or subrange in between. In a non-limiting example, the lithium metal oxide particles have an average particle size of about 1 μm to about 10 μm.

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

As used herein, a battery "successfully operates" in a bent, rolled, or folded configuration if the charge-discharge capacity of the battery in the bent, rolled, or folded configuration is substantially the same as the charge-discharge capacity of the battery before being bent, rolled, or folded (i.e., the original or flat capacity), as measured, e.g., by the output of a device connected to the battery. The bent, rolled, or folded capacity is "substantially the same" as the original or flat charge-discharge capacity if it is within 75% of the original or flat charge-discharge capacity at 0.1 C-rate. As will be known to those of ordinary skill in the art, 0.1, 1, 10, 100, etc. "C-rate"(s) is a term of art well known among those working on characterization of batteries. As used herein, "1 C-rate" means that the constant discharge current will discharge the entire battery in 1 hour, or the constant charge current will charge the battery in 1 hour. As used herein, "0.1 C-rate" means that the current is 10 times smaller, and it will charge/discharge the battery in 10 hours. Practically, first a "theoretical capacity" in A*h (or mA*h) of a battery is calculated based on the amount of the active material in the battery and the material's specific capacity. Then it is divided by the desired number of hours (1 hour for 1 C, 5 hours for 0.2 C, 10 hours for 0.1 C, 0.1 hour for 10 C, etc.), and the charge/discharge current is calculated. The battery charge or discharge capacity is then measured using this current, and this is referred to as the charge or discharge capacity at that C-rate.

In some aspects, the battery is in a single cell configuration. FIG. 1A shows a schematic of a battery 100 according to the present disclosure in a single cell configuration. In some such aspects, a first packaging layer 101 is adjacent to an anode layer 102, which is adjacent to a separator layer 103, which is adjacent to a cathode layer 104, which is adjacent to a second packaging layer 101. The anode layer 102 and/or the cathode layer 104 may be configured to include a point of attachment for a battery tab 106.

In some aspects, the battery is in a multicell configuration. FIG. 1B shows a schematic of a battery 110 according to the present disclosure in a multicell configuration. In some such aspects, multiple alternating layers of anode 102 and cathode 104 are arranged between separator layers 103 and packaging layers 101. Each anode layer 102 and/or cathode layer 104 may be configured to include a point of attachment for a battery tab. For the anode layer 102, the battery tab is suitably a copper tab or lead 105. For the cathode layer 104, the battery tab is suitably an aluminum tab or lead 106. In a multicell configuration, some electrodes in the inner parts of the multi-cell are contacting separator membranes 103 on both sides (FIG. 1B, 3B). The numbers of electrode layers and separator layers in the multicell configuration are not particularly limited, and the multicell configuration battery 110 may contain additional anode, cathode, and/or separator layers than shown in FIG. 1B, as indicated by the optional additional layers 111. Battery 110 may be similar in some aspects to battery 100.

Electrodes according to the present disclosure may be manufactured according to any suitable means known to those of ordinary skill in the art. For example, the anode and/or the cathode may be prepared using the methods and apparatuses disclosed in U.S. patent application Ser. No. 15/665,171, filed on Jul. 31, 2017, entitled "Self-Standing Electrodes and Methods for Making Thereof" The method of making the self-standing electrode with an embedded tab is disclosed in U.S. patent application Ser. No. 16/123,872, filed on Sep. 6, 2018, entitled "Method For Embedding A Battery Tab Attachment In A Self-Standing Electrode Without Current Collector Or Binder." The method of making the tab configuration shown in the present disclosure, among other configurations, is disclosed in U.S. patent application Ser. No. 16/123,935, filed on Sep. 6, 2018, entitled "Production Of Solely Carbon Nanotubes Supported Self-Standing Electrodes For Flexible Li-Ion Batteries." The disclosure of each of the preceding applications is expressly incorporated by reference herein. Carbon nanotubes suitable for use in the methods of the present disclosure include single-walled nanotubes, few-walled nanotubes, and multi-walled nanotubes. In some aspects, the carbon nanotubes are single-walled nanotubes. Few-walled nanotubes and multi-walled nanotubes may be synthesized, characterized, co-deposited, and collected using any suitable methods and apparatuses known to those of ordinary skill in the art, including those used for single-walled nanotubes.

Suitable separator materials include those known to persons of ordinary skill in the art for use in between battery anodes and cathodes, to provide a barrier between the anode and the cathode while enabling the exchange of metal ions from one side to the other, such as a membranous barrier or a separator membrane. Suitable separator materials include, but are not limited to, polymers such as polypropylene, polyethylene and composites of them, as well as PTFE. The separator membrane is permeable to metal ions, allowing them to travel from the cathode side to the anode side and back during the charge-discharge cycle. But the separator membrane is impermeable to anode and cathode materials, preventing them from mixing, touching and shorting the battery. The separator membrane also serves as electrical insulator for metal parts of the battery (leads, tabs, current collectors, metal parts of the enclosure, etc.) preventing them from touching and shortening. The separator membrane also prevents flows of the electrolyte.

In some aspects, the separator is a thin (15-25 µm) polymer membrane (tri-layer composite: polypropylene-polyethylene-polypropylene, commercially available) between two relatively thick (20-1000 µm) porous electrode sheets produced by our technology. The thin polymer membrane may be 15-25 µm thick. The two relatively thick porous electrode sheets may each independently be 50-500 µm thick.

The polymer used in the polymer pouch cell may be any polymer suitable for use in an electrochemical cell, such as to protect the electrochemical cell from the outside environment or, in the case of a flexible battery used in a wearable device, also to protect the user from the electrochemical cell. As will be known to those of ordinary skill in the art, the pouch cell refers to the external packaging material holding the electrodes and separator(s), and electrolyte inside. Suitable materials include those known to those of ordinary skill in the art, such as polyethylene (including polyethylene- or polypropylene-coated aluminum: e.g., Polyamid (JIS Z1714): 0.025 mm(+−0.0025 mm), Adhesive (Polyester-polyurethane): 4-5 g/m2, Aluminum foil (JIS A8079, A8021): 0.040 mm(+−0.004 mm), Adhesive (Urethane-free Adhesive): 2-3 g/m2, Polypropylene: 0.040 mm(+−0.004 mm)), PTFE, PDMS, others. Batteries according to the present disclosure may be assembled using any suitable method, including those known to persons of ordinary skill in the art.

Battery tabs can be attached to the electrodes, in accordance with aspects of the present disclosure, either to protrusions extending from the main body of the respective electrode to past the separator membrane and not overlapping with the other electrode; or to the main body of the respective electrode at cutouts of the separator membrane and the opposing electrode. Suitable battery tab materials and methods of attachment include those known to persons of ordinary skill in the art. It should be understood that the battery tabs disclosed herein are not current collectors.

In some aspects, batteries according to the present disclosure are assembled by placing a separator between a fully prepared anode and a fully prepared cathode without any further repressing. As used herein, a "fully prepared" anode or cathode is one that has been pressed and attached to a tab. In some aspects, batteries according to aspects of the present disclosure are assembled by placing a separator between a pre-pressed anode and a pre-pressed cathode, and pressing them all together. As used herein, a "pre-pressed" electrode is one that has been pressed but may or may not be attached to a tab or have embedded within a tab attachment. In some aspects, the battery can be assembled by placing a separator between one un-pressed first electrode (anode or cathode) and a pre-pressed electrode (anode or cathode), and the whole assembly can be pressed together.

Preferably, the concentration of carbon nanotubes on the surfaces of the electrodes facing the separator is higher (5-100 wt % of nanotubes) than that in the bulk of the electrodes (0.5-10 wt % of nanotubes), while the concentration of carbon nanotubes on the surfaces of the electrodes facing away from the separator is lower (0-1 wt % of nanotubes) than that in the bulk of the electrodes (FIG. 3). Composite material comprising more than about 5% of nanotube is considered by those of ordinary skill in the art to be very sticky, and will stick to separator membrane and to stainless steel (which is a typical material that the rollers of the roller mills are made of) as well as to many other materials. For example, a composite material comprising 5% nanotube, 95% NMC (Lithium Nickel Manganese Cobalt Oxide, $LiNi_xMn_yCo_zO_2$) (especially when freshly made) sticks to the rollers so well, that it is difficult to separate it from the rollers without tearing the composite. However, the same material "dusted" with NMC powder will not stick to the rollers in any appreciable amount. These "border layers" may be 2-5 times thicker than the average size of the active material particle/flake; e.g., for NMC particles used in a cathode, with an average diameter of about 10 µm, 20-30 µm thick "border layers" with increased or decreased nanotube content may be sufficient. In accordance with aspects of the present disclosure, this distribution of carbon nanotubes on or within the electrodes will promote adhesion of electrodes to the separator membrane, while reducing the adhesion to the rollers and other elements of the pressing apparatus (for pressed electrodes and pressed batteries). This distribution can be achieved by varying the ratio(s) of the nanotube aerosol to the active material aerosol(s) (i.e., the ratio of the weight of nanotubes deposited per unit time to the weight of the active material deposited per the same unit time) during the growth of electrode material (e.g., 100% active material aerosol at the beginning of the synthesis, 97% active material aerosol, and 3% nanotube aerosol during most of the synthesis, and 100% nanotube aerosol during the end of the synthesis). For example, according the present disclosure, a nanotube synthesis reactor may be configured to produce about 2 mg of aerosolized nanotubes per hour (the amount deposited on the frit/filter). In the same setup the NMC feeder may be set to aerosolize from about 2 to 600 mg of NMC particles per hour (again, the amount deposited on the same filter). Therefore, depending on the settings on the NMC feeder, it is possible to deposit material containing from 50% nanotubes (2 mg+2 mg) to about 0.3% nanotubes (2 mg+600 mg). Operating only nanotube reactor (NMC feeder off) produces 100% nanotube material, while operating only NMC feeder (nanotube reactor off) produces 0% nanotube material (NMC powder). Suitable methods of varying ratios of nanotube aerosol and active nanotube aerosol(s) during growth include, but are not limited to, those disclosed in U.S. patent application Ser. No. 15/665,171, entitled "Self-Standing Electrodes and Methods for Making Thereof," filed Jul. 31, 2017.

The battery may be of any size, i.e., of any length, width, and height. In some aspects, the thickness of the battery is from 0.01 mm to 10 mm. In some aspects, the length and width are each independently 0.1 mm to 10000 mm.

Figure 2B:
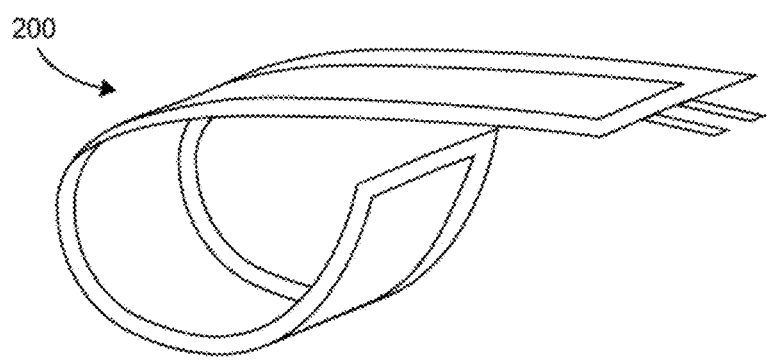

FIGS. 2A and 2B show a battery according to the present disclosure. The complete pouch battery cell contains 3×4 cm electrodes. The battery thickness is 3 mm. In the flat configuration (FIG. 2A), the battery 200 operates to power electronics and electronic devices. After multiple instances of bending at various angles and in various directions, the battery 200 was still able to power the electronic device. In the rolled configuration (FIG. 2B). Battery 200 may be similar in some aspects to battery 100.

Figure 4A:
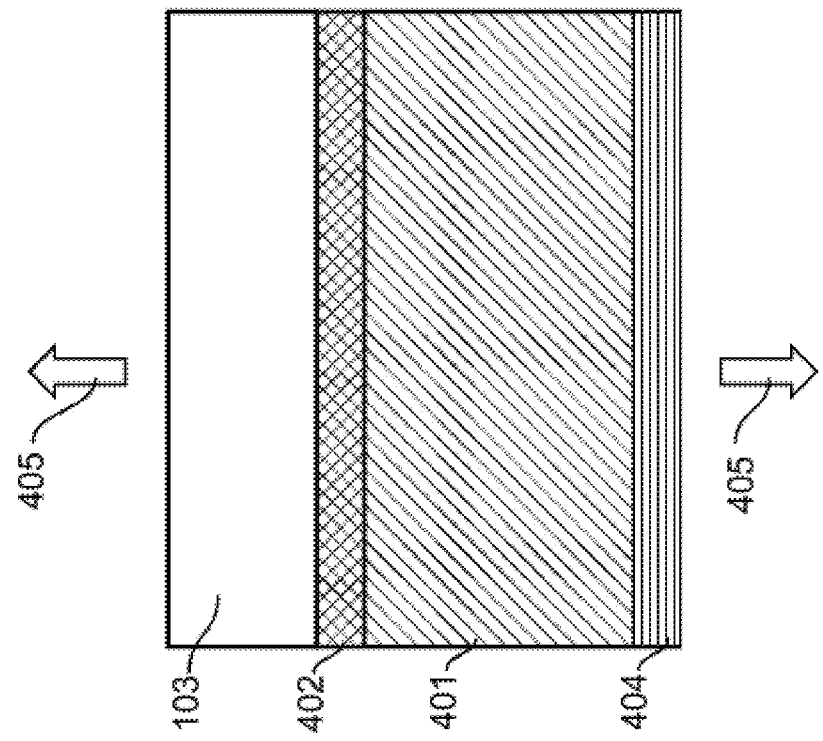
FIGS. 4A and 4B show schematic cross-sections of the preferred electrode layer structure, according to some aspects of the present disclosure, with separator membrane on both sides (FIG. 4A) or only one side (FIG. 4B).

For batteries 300 in a configuration as shown in FIG. 3A, where all electrodes (e.g., anode 102 and cathode 104 in FIG. 3A), as well as inner electrodes 102 and 104 of the battery 310 in the multi-cell configuration shown at FIG. 3B, are contacting separator membranes 103 on both sides, it is beneficial to have the increased nanotube content 402 (in the electrode) on both surfaces of the electrode (i.e., on both faces of anode 102, both of which are in contact with a separator membrane 103, and on both faces of cathode 104, both of which are in contact with a separator membrane 103) (FIG. 4A). In FIG. 4A, the center of the electrode contains the bulk of the electrode material 401, which contains 0.5-10 wt % of nanotubes. Moving outward from the electrode center toward the separator membrane 103, band 402 contains electrode material with increased nanotube content, such as 5-100 wt % of nanotubes. Band 402 contacts separator membrane 103 on its outer edge, and separator membrane 103 extends away from the side facing band 402 to the side facing towards a roller or press in manufacturing, in direction 405. Batteries 300 and 310 may be similar in some aspects to battery 100.

Figure 4B:
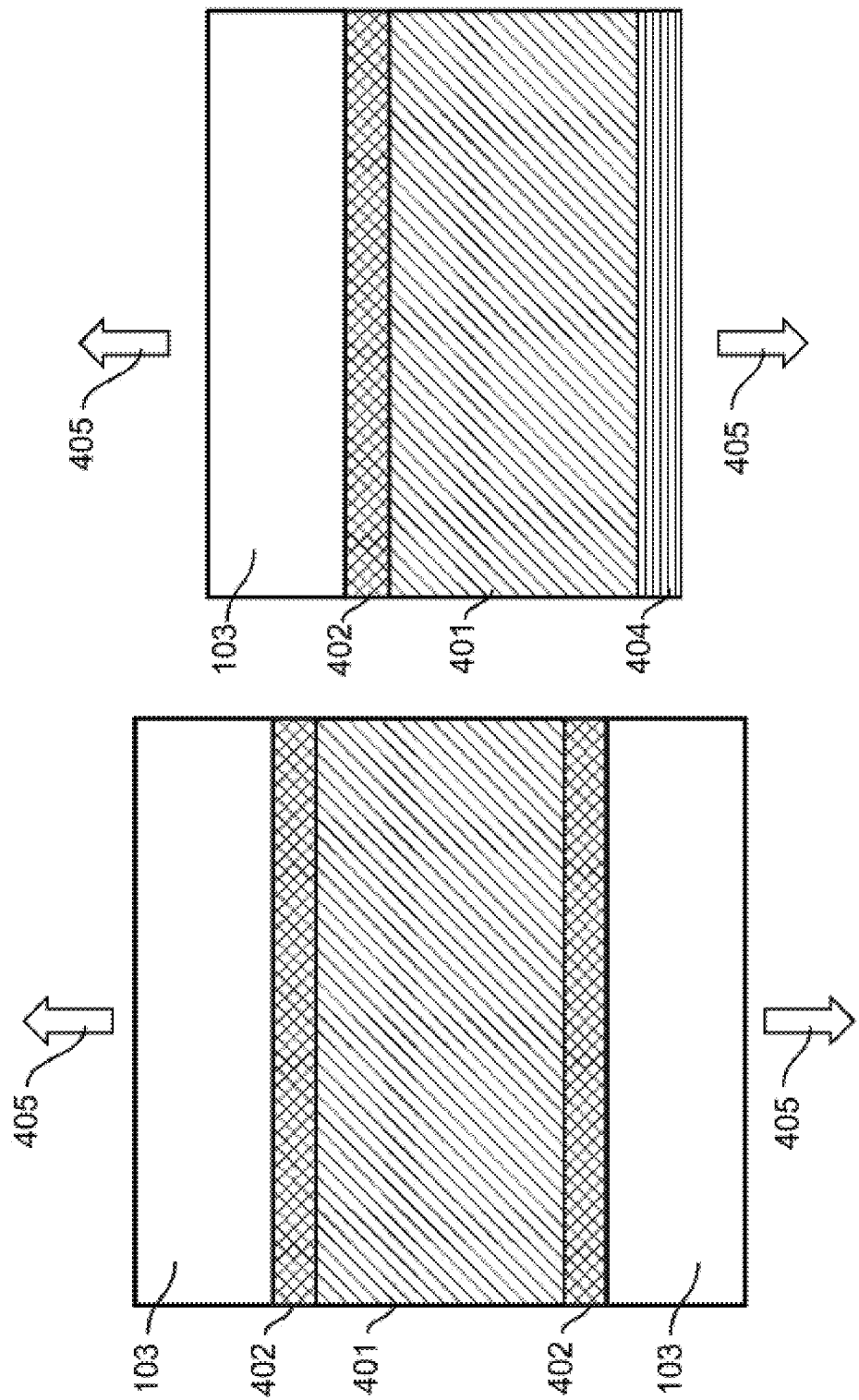

The difference between FIGS. 3A-3B and FIGS. 1A-1B is that extra separator membrane layers 103 are added on both outer sides of the cell (both single-cell or multi-cell configurations), to improve mechanical integrity of the cell and to allow better sliding of the cell in respect to packaging. This extra layer of the separator membrane 103 can even be wrapped around the assembled cell. All electrodes of the batteries shown at FIGS. 3A and 3B (both single-cell or multi-cell configurations) will be in the configuration shown at FIG. 4A, while outer electrodes of the batteries shown at FIGS. 1A-1B will be in the configuration shown at FIG. 4B. In FIG. 4B, the outer face of separator membrane 103 faces in direction 405, toward a roller or press, and the inner face faces band 402 of the electrode, which has an increased nanotube content, such as 5-100 wt % of nanotubes. Continuing inward across band 402, the opposite face of band 402 faces region of bulk electrode material 401, containing 0.5-10 wt % of nanotubes. The opposite face of region of bulk electrode material 401, in turn, faces a region of reduced nanotube content 404, containing 0-1 wt % of nanotubes. Moving even further inward, the opposite face of region of reduced nanotube content 404 faces inward in direction 405 towards a roller or press.

Figure 5:
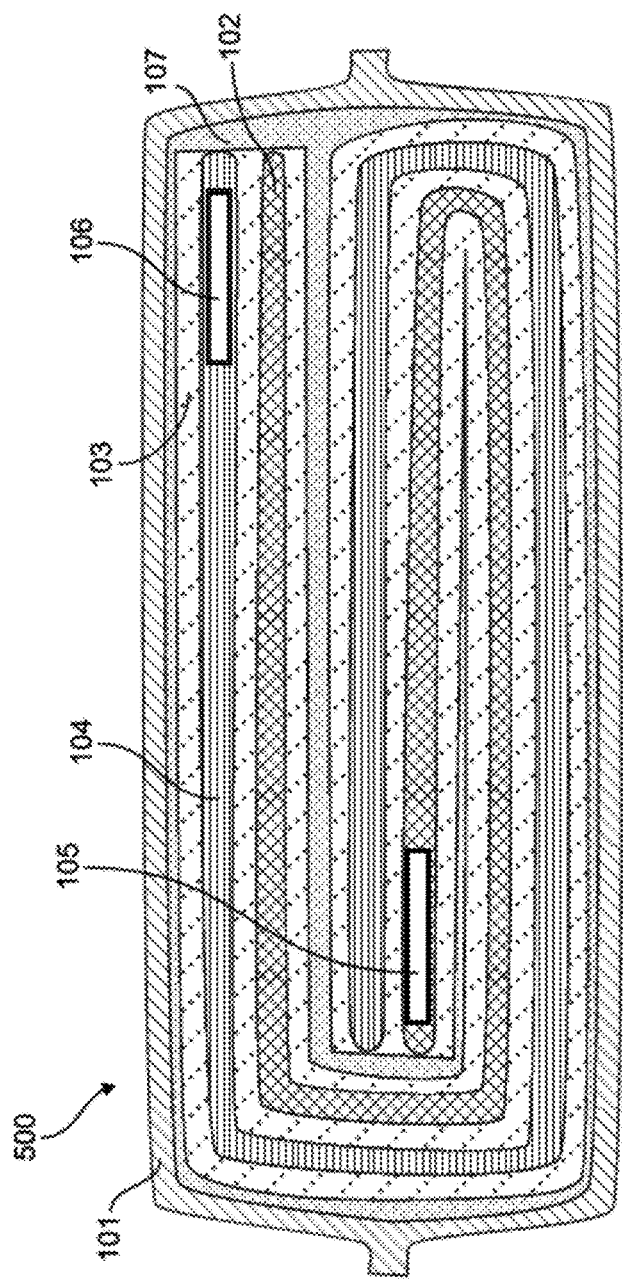
FIG. 5 shows a battery according to some aspects of the present disclosure in a folded configuration.

The cell assembly according to the present disclosure (i.e., the anode, the separator, and the cathode in a single-cell configuration; or the alternating layers of a separator layer, one or more anodes, one or more separators, and one or more cathodes in a multi-cell configuration) may be encapsulated in a pouch cell either flat (i.e., as shown in FIGS. 1A, 1B, and 2A) or folded one or more times prior to encapsulation in a pouch cell (as shown in FIG. 5). In pouch cell battery 500, a battery containing layers of separator membrane 103, anode 102, separator membrane 103, cathode 104, and separator membrane 103 is folded one or more times before being encapsulated by a pouch cell made of a packaging layer 101. An electrolyte 107 is also suitably included in the pouch cell during encapsulation. The anode layer 102 and cathode layer 104 may each be configured to include a point of attachment for a battery tab. For the anode layer 102, the battery tab is suitably a copper tab or lead 105. For the cathode layer 104, the battery tab is suitably an aluminum tab or lead 106. Battery 500 may be similar in some aspects to battery 100.

Encapsulation in a pouch cell, such as in packaging layer 101, after prior folding may increase battery capacity but may also reduce battery flexibility. In the folded configuration, additional separator membrane may be required to prevent the electrodes from touching each other (or to prevent any of their electrical leads from touching each other). In some such aspects, it may be beneficial to include one or two extra layers of separator membrane, such that the multi-cell configuration alternates as shown in FIGS. 3A-3B, in part: separator 103, anode 102, separator 103, cathode 104, separator 103. Such assembly not only simplifies the folded configuration shown in FIG. 5, but also makes the battery mechanically stronger, allowing it to withstand additional bending, folding, rolling, flexing, and/or wear and tear; because the added separator layers facilitate sliding the cell assembly into the pouch cell, and, even more importantly, allows the cell assembly to slide as a whole in respect to packaging/encapsulation during bending, folding, flexing, etc. with minimal movement of the cell components in respect to each other. Such movements of the internal cell components in respect to each other can be detrimental to the cell performance. It is preferable for this configuration for the electrode (cathode or anode or both) material to have increased nanotube concentration on both faces, i.e., both faces of the electrode that contact a separator membrane. With an increased concentration of nanotubes at the electrode faces, the electrode will stick well to both separator membranes, thereby facilitating assembly and/or pressing of the whole 5-layer cell assembly, since only separator membrane(s) would touch rollers or other equipment. In the case where only one extra separator membrane is used, then the electrode material face that does not contact or face a separator membrane preferably has a reduced nanotube content on the face not contacting a separator membrane.

In one embodiment, flexible battery of present disclosure provides not only power source for wearable sensors or devices but also a platform for integration of electronic devices, e.g. sensors. Specifically, the surface of packaging layer 101 of flexible battery is used as a substrate to attach, print, and/or embed the electronic devices. Examples of suitable electronic devices include various types of sensors, microprocessors, wireless communication devices/transmitting devices (e.g. antenna), circuit boards, and other electronics (e.g. accelerometer, gyroscope). Examples of suitable sensors include those for detecting heart rate, respiratory rate, blood pressure, blood oxygen saturation, body temperature, muscle activity, seizure events, electroencephalography (EEG), epileptic crises, electroencephalogram (ECG), electromyographic data (EMG), and electrodermal activity (EDA). Additional examples of suitable sensors include those for monitoring concentrations of pollutants and movement of objects. In one embodiment, the wearable devices integrated with flexible batteries have a wide range of applications including monitoring environmental pollution, space exploration, homeland security, biology, and medicine. One the of preferred applications of wearable sensors/devices is real time monitoring of human physiological parameters.

Figure 6:
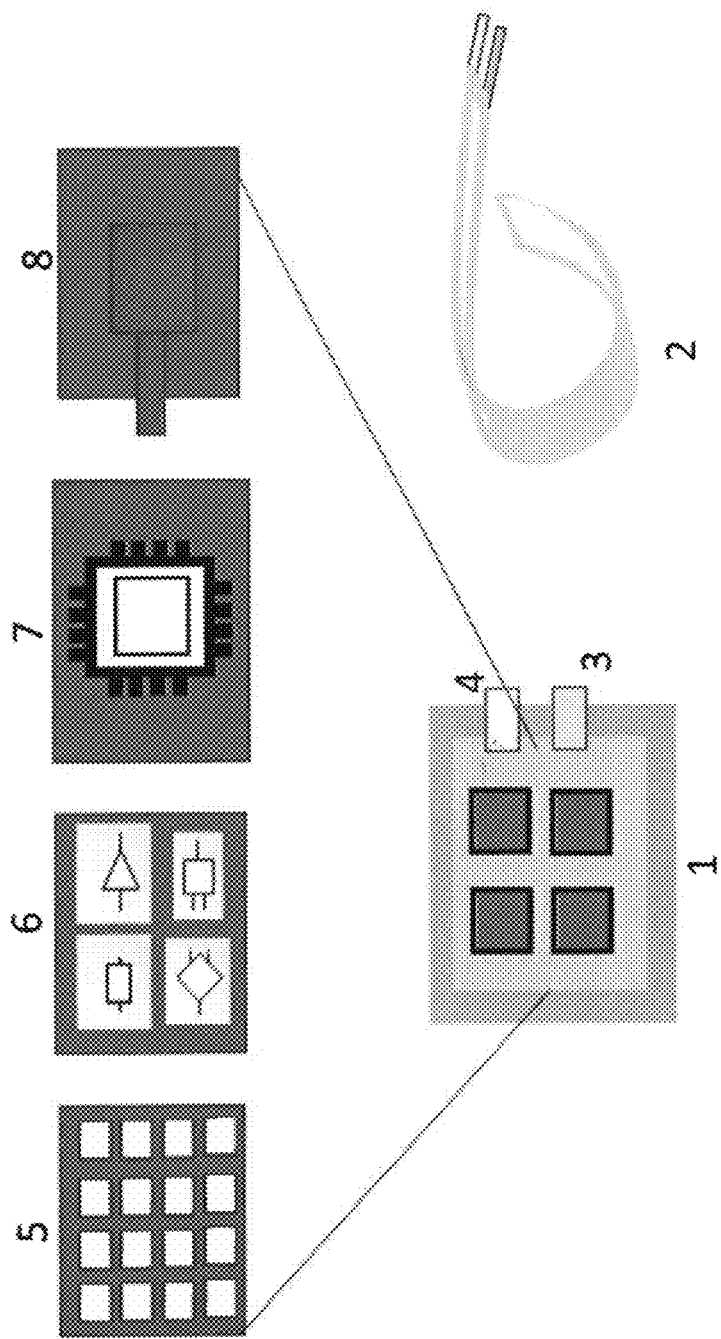
FIG. 6 shows wearable devices having an electronic component attached to, printed on, and/or embedded on the surface of packaging material of flexible battery according to some aspects of the present disclosure.

FIG. 6 illustrates a wearable device comprising a flexible battery 2 and an integrated electronic device 1. The flexible battery 2 is similar as battery 200 of FIG. 2B. Optionally shown, 3 and 4 can be attachments for powering devices as conductive battery tabs. The electronic device 1 of FIG. 6, comprises a plurality of sensors 5, circuit boards/electronics 6, microprocessors 7, and antenna 8. The components 1-8 in FIG. 6 are for illustration purpose only and is not intended to be limited to a single preferred embodiment. For example, components 5-8 can be either embedded in electronic device 1 individually or can be integrated together in any useful combinations to form a sensor complex for a specific purpose. The integration of microprocessors allows onboard processing of data collected by various types of sensors. Alternatively, the data collected by the sensors can be uploaded through an antenna to an APP running on a separate mobile processing device, such as a smartphone. The mobile processing device allows fast calculation and simultaneous display of the collected data. Even further, depending on the structure of sensor complex, both onboard processing and remote processing by a mobile device may be performed simultaneously.

Compared to some common commercial wearable devices, such as a watch, the present wearable devices integrated with flexible battery show clear advantages in real time monitoring of human physiological state. Flexible battery as a substrate directly provides power to the sensors and other electronics embedded in the packaging layer and does not requires a separate power source. Flexible battery as a substrate further provides ample space for large number of embedded sensors and other electronics generating very large contact area, whereas a watch has rather limited space to integrate everything and the contact area of sensors is also limited, if not close to a single spot. More sensors along with large contact area as shown by the present wearable devices will result in more accurate and faster readings of physiological parameters. Flexible battery may take many forms, such straps, wristband, and patches. Accordingly, the present wearable devices integrated with flexible battery can be attached to limbs of a person or an animal, such as wrist/ankle bands or straps if needed, and can be attached to torso or head as straps or patches. In this way, the present wearable devices may be placed to the most desirable places of a subject, such as an animal or a human, to obtain more accurate and faster readings of physiological parameters.

The dimension of components 5-8 in FIG. 6 ranges from a few microns to a few millimeters. Due to the small footprint of the embedded sensors and electronics, the present wearable devices integrated with flexible battery are comfortable to wear, flexible, light, miniature, and washable.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

According to some aspects, a flexible battery assembly is disclosed herein, comprising: a flexible battery with a packaging layer; an electronic device embedded in, attached to, and/or printed on the packaging layer such that the flexible battery provides power to the electronic device. The flexible battery assembly can be constructed to be wearable by a user. In non-limiting examples, the flexible battery can be in a shape operative for attachment to limbs, torso, or head of an animal or a human. The flexible battery assembly can be in the form of a wrist band, ankle band, head band, strap, headphone, shoe, patch, prosthesis, clothing, hat, hearing aid, and combinations thereof. For example, the electronic device can comprise sensors, processors, wireless communication/transmitting devices, circuit boards, electrical power generation devices (e.g. solar cell, nanogenerator, thermoelectric generator, electrical generator), electronics, GPS, displays, and combinations thereof. In some embodiments, the electronic device can be attachable and detachable from the packaging layer of the flexible battery. For example, the sensors can comprise a heart rate sensor, respiratory rate sensor, blood pressure sensor, blood oxygen sensor, body temperature sensor, muscle activity sensor, seizure event sensor, electroencephalography (EEG) sensor, epileptic crises sensor, electroencephalogram (ECG) sensor, electromyographic data (EMG) sensor, electrodermal activity (EDA) sensor, pollutant sensor, movement sensor, and combinations thereof wherein the sensors can be operative to provide data and wherein the data is transmitted from the electronic device. In some embodiments, the sensors can further comprise an emergency transmitter in communication with one or more of the sensors, the emergency transmitter operative to transmit a signal if one or more of the sensors reach a threshold measurement, for example, a seizure event threshold, low body temperature threshold, or a low heart rate threshold.

In some embodiments, the flexible battery as an integration platform for electronic devices provides an integration platform for another battery.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects.

Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

What is claimed is:

1. A flexible battery assembly comprising:
    a flexible battery comprising:
        an anode having a first anode side and a second anode side,
        a cathode having a first cathode side and a second cathode side, wherein the first cathode side faces the first anode side,
        a first flexible separator membrane proximal to the second anode side,
        a second flexible separator membrane proximal to the second cathode side, and
        a third flexible separator membrane between the anode and the cathode,
        wherein the anode, the cathode, the first flexible separator membrane, the second flexible separator membrane, and the third flexible separator membrane are provided within a packaging layer to form a pouch cell, and
        wherein the packaging layer forms an enclosure of the pouch cell; and
    an electronic device embedded in, attached to, and/or printed on the packaging layer such that the flexible battery provides power to the electronic device,
    wherein the anode and/or the cathode is self-standing and comprises a composite material having active material particles in a three-dimensional cross-linked network of carbon nanotubes,
    wherein the anode, the cathode, the first flexible separator membrane, the second flexible separator membrane, and the third flexible separator membrane are folded inside the packaging layer,
    wherein the packaging layer is flat and rollable along a plurality of battery axes, and
    wherein the electronic device is attachable and detachable from the packaging layer of the flexible battery.

2. The flexible battery assembly of claim 1, wherein the flexible battery assembly is constructed to be wearable by a user.

3. The flexible battery assembly of claim 1, wherein the electronic device comprises sensors, processors, wireless communication/transmitting devices, circuit boards, electronics, GPS, displays, and combinations thereof.

4. The flexible battery assembly of claim 3, wherein the sensors comprise a heart rate sensor, respiratory rate sensor, blood pressure sensor, blood oxygen sensor, body temperature sensor, muscle activity sensor, seizure event sensor, electroencephalography (EEG) sensor, epileptic crises sensor, electroencephalogram (ECG) sensor, electromyographic data (EMG) sensor, electrodermal activity (EDA) sensor, pollutant sensor, movement sensor, and combinations thereof.

5. The flexible battery assembly of claim 2, wherein the flexible battery is in a form of a wrist band, ankle band, head band, strap, headphone, shoe, patch, clothing, hat, hearing aid, and combinations thereof.

6. The flexible battery assembly of claim 2, wherein the flexible battery is in a shape operative for attachment to limbs, torso, or head of an animal or a human.

7. The flexible battery assembly of claim 3, wherein the sensors are operative to provide data and wherein the data is transmitted from the electronic device.

8. The flexible battery assembly of claim 4, further comprising an emergency transmitter in communication with one or more of the sensors, the emergency transmitter operative to transmit a signal if one or more of the sensors reach a threshold measurement.

9. The flexible battery assembly of claim 1, wherein the electronic device comprises an electric power generation device.

10. The flexible battery assembly of claim 9, wherein the electric power generation device is a solar cell, a nanogenerator, a thermoelectric generator, an electrical generator, or combinations thereof.

11. A method of making a wearable integration platform for an electronic device, the method comprising:
    providing a flexible battery comprising:
        a cathode having a first cathode side and a second cathode side,
        an anode having a first anode side and a second anode side, wherein the first anode side faces the first cathode side, a first flexible separator membrane proximal to the second anode side, a second flexible separator membrane proximal to the second cathode side, and a third flexible separator membrane between the anode and the cathode within a packaging layer in order to form a pouch cell, wherein the packaging layer forms an enclosure of the pouch cell;

embedding in, printing on, and/or attaching one or more electronic devices to the packaging layer; and electrically connecting the one or more electronic devices to the flexible battery, wherein the anode and/or the cathode is self-standing and comprises a composite material having active material particles in a three-dimensional cross-linked network of carbon nanotubes, wherein the anode, the cathode, the first flexible separator membrane, the second flexible separator membrane, and the third flexible separator membrane are folded inside the packaging layer, wherein the packaging layer is flat and rollable along a plurality of battery axes, and wherein the one or more electronic devices are attachable and detachable from the packaging layer of the flexible battery.

12. A method of making an electronic device comprising:
assembling the electronic device by printing in, embedding in, and/or attaching the electronic device to a flexible battery packaging of a flexible battery, wherein the flexible battery packaging encloses:

a cathode having a first cathode side and a second cathode side, an anode having a first anode side and a second anode side, wherein the first anode side faces the first cathode side, a first flexible separator membrane proximal the second anode side, a second flexible separator membrane proximal the second cathode side, and a third flexible separator membrane between the anode and the cathode to form a pouch cell; and providing power to the electronic device from the flexible battery, wherein the anode and/or the cathode is self-standing and comprises a composite material having active material particles in a three-dimensional cross-linked network of carbon nanotubes, wherein the anode, the cathode, the first flexible separator membrane, the second flexible separator membrane, and the third flexible separator membrane are folded inside the flexible battery packaging, wherein the flexible battery packaging is flat and rollable along a plurality of battery axes, and wherein the electronic device is attachable and detachable from the flexible battery packaging layer of the flexible battery.

13. The method of claim 12, wherein the electronic device, the flexible battery packaging, and the flexible battery are wearable by a user.

14. The flexible battery assembly of claim 1, wherein a concentration of carbon nanotubes at the first side of the anode and/or the first side of cathode is greater than a concentration of carbon nanotubes at the second side of the anode and/or the second side of the cathode, and wherein the concentration of carbon nanotubes at the first side of the anode and/or the first side of the cathode is about 5-100 wt %.

15. The flexible battery assembly of claim 14, wherein the concentration of carbon nanotubes at the second side of the anode and/or the second side of the cathode is about 0-1 wt %.

16. The flexible battery assembly of claim 14, wherein the concentration of carbon nanotubes at the second side of the anode and/or the second side of the cathode is 0 wt %.

* * * * *